United States Patent
Hyslop et al.

(10) Patent No.: US 11,864,004 B2
(45) Date of Patent: *Jan. 2, 2024

(54) CONCENTRIC CELLS IN A WIRELESS COMMUNICATION SYSTEM

(71) Applicant: SMARTSKY NETWORKS LLC, Morrisville, NC (US)

(72) Inventors: Douglas Hyslop, Vienna, VA (US); Andrew P. Caplan, McLean, VA (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,230

(22) Filed: Jan. 18, 2023

(65) Prior Publication Data
US 2023/0156490 A1 May 18, 2023

Related U.S. Application Data

(63) Continuation of application No. 17/167,628, filed on Feb. 4, 2021, now Pat. No. 11,570,631, which is a (Continued)

(51) Int. Cl.
*H04W 40/00* (2009.01)
*H04W 16/30* (2009.01)
(Continued)

(52) U.S. Cl.
CPC ............ *H04W 16/30* (2013.01); *H01Q 1/246* (2013.01); *H01Q 21/00* (2013.01); *H01Q 21/28* (2013.01);
(Continued)

(58) Field of Classification Search
CPC ..... H04W 16/30; H04W 16/24; H04W 16/28; H04W 88/08; H01Q 1/246; H01Q 21/00;
(Continued)

(56) References Cited

U.S. PATENT DOCUMENTS 5,878,345 A * 3/1999 Ray ................... H04B 7/18506
455/448
6,618,016 B1 9/2003 Hannan et al.
(Continued)

FOREIGN PATENT DOCUMENTS

CN 101176367 A 5/2008
CN 101536566 A 9/2009
(Continued)

OTHER PUBLICATIONS

International Search Report and Written Opinion from related International Application No. PCT/US2014/018468 dated Sep. 3, 2014, all pages cited in its entirety.
(Continued)

*Primary Examiner* — Amancio Gonzalez
(74) *Attorney, Agent, or Firm* — Burr & Forman LLP

(57) ABSTRACT

Aspects described herein relate to a base station for providing air-to-ground wireless communication over various altitudes. The base station includes a first antenna array comprising one or more antennas configured to form a first cell coverage area extending substantially from a horizon up to a first elevation angle away from the first antenna array to a predetermined distance from the first antenna array. The base station further includes a second antenna array configured at an uptilt elevation angle to form a second cell coverage area extending at least from the first elevation angle to a second elevation away from the second antenna array, wherein the first cell coverage area and the second cell coverage area are concentric to define the ATG cell at least to the predetermined distance and up to a predetermined elevation.

18 Claims, 5 Drawing Sheets

Related U.S. Application Data continuation of application No. 16/934,620, filed on Jul. 21, 2020, now Pat. No. 10,945,139, which is a continuation of application No. 16/560,072, filed on Sep. 4, 2019, now Pat. No. 10,757,585, which is a continuation of application No. 16/260,615, filed on Jan. 29, 2019, now Pat. No. 10,455,432, which is a continuation of application No. 15/881,818, filed on Jan. 29, 2018, now Pat. No. 10,231,137, which is a continuation of application No. 15/291,572, filed on Oct. 12, 2016, now Pat. No. 9,924,378, which is a continuation of application No. 15/002,609, filed on Jan. 21, 2016, now Pat. No. 9,497,640, which is a continuation of application No. 14/689,335, filed on Apr. 17, 2015, now Pat. No. 9,277,420, which is a continuation of application No. 13/832,752, filed on Mar. 15, 2013, now Pat. No. 9,014,704.

(51) Int. Cl.

| | |
|---|---|
| *H04W 16/24* | (2009.01) |
| *H01Q 21/29* | (2006.01) |
| *H01Q 1/24* | (2006.01) |
| *H01Q 21/00* | (2006.01) |
| *H04B 1/40* | (2015.01) |
| *H01Q 21/28* | (2006.01) |
| *H01Q 25/00* | (2006.01) |
| *H04W 16/28* | (2009.01) |
| *H04B 7/185* | (2006.01) |
| *H04W 88/08* | (2009.01) |

(52) U.S. Cl.
CPC .............. *H01Q 21/29* (2013.01); *H01Q 25/00* (2013.01); *H04B 1/40* (2013.01); *H04W 16/24* (2013.01); *H04B 7/18506* (2013.01); *H04W 16/28* (2013.01); *H04W 88/08* (2013.01)

(58) Field of Classification Search
CPC ........ H01Q 21/28; H01Q 21/29; H01Q 25/00; H04B 1/40; H04B 7/18506
USPC ...................................... 455/424, 431, 446
See application file for complete search history.

(56) References Cited

U.S. PATENT DOCUMENTS

| | | | | |
|---|---|---|---|---|
| 6,642,894 | B1* | 11/2003 | Gross | H01Q 21/29 |
| | | | | 343/705 |
| 6,735,438 | B1* | 5/2004 | Sabatino | H01Q 1/246 |
| | | | | 343/705 |
| 8,848,605 | B2 | 9/2014 | Ohm et al. | |
| 9,014,704 | B2* | 4/2015 | Hyslop | H01Q 21/29 |
| | | | | 455/448 |
| 9,277,420 | B2 | 3/2016 | Hyslop et al. | |
| 9,497,640 | B2 | 11/2016 | Hyslop et al. | |
| 9,991,945 | B2 | 6/2018 | Hommel et al. | |
| 10,455,432 | B2 | 10/2019 | Hyslop et al. | |
| 11,570,631 | B2* | 1/2023 | Hyslop | H01Q 21/28 |
| 2002/0167954 | A1 | 11/2002 | Highsmith et al. | |
| 2006/0040660 | A1* | 2/2006 | Cruz | H04W 16/12 |
| | | | | 455/431 |
| 2008/0102814 | A1* | 5/2008 | Chari | H04B 7/18506 |
| | | | | 455/424 |
| 2009/0224995 | A1* | 9/2009 | Puente | H01Q 5/307 |
| | | | | 343/893 |
| 2011/0032149 | A1 | 2/2011 | Leabman | |
| 2011/0182230 | A1* | 7/2011 | Ohm | H04B 7/185 |
| | | | | 370/328 |
| 2012/0200458 | A1* | 8/2012 | Jalali | H01Q 21/062 |
| | | | | 342/372 |
| 2014/0274075 | A1* | 9/2014 | Hyslop | H04B 7/18506 |
| | | | | 455/446 |
| 2016/0142923 | A1 | 5/2016 | Hyslop et al. | |
| 2018/0160319 | A1 | 6/2018 | Hyslop et al. | |

FOREIGN PATENT DOCUMENTS

| | | | |
|---|---|---|---|
| EP | 2434577 | A1 | 3/2012 |
| WO | 2006123227 | A2 | 11/2006 |
| WO | 2011017576 | A2 | 2/2011 |

OTHER PUBLICATIONS

Chapter 1 International Preliminary Report on Patentability of corresponding Application No. PCT/US2014/018468 dated Sep. 24, 2015, all enclosed pages cited.

Extended European Search Report and Written Opinion of corresponding European Application No. 14769252.9 dated Sep. 15, 2016, all enclosed pages cited.

Office Action from related Chinese Application No. 201480027629.3 dated Feb. 6, 2018, all enclosed pages cited.

Examination Report from corresponding Chinese Application No. 201480027629.3 dated Jul. 5, 2018, all enclosed pages cited.

* cited by examiner

CONCENTRIC CELLS IN A WIRELESS COMMUNICATION SYSTEM

CROSS-REFERENCE TO RELATED APPLICATIONS

This application is a continuation of U.S. application Ser. No. 17/167,628 filed Feb. 4, 2021, which is a continuation of U.S. application Ser. No. 16/934,620, filed on Jul. 21, 2020 (now granted as U.S. Pat. No. 10,945,139 which issued on Mar. 9, 2021), which is a continuation of U.S. application Ser. No. 16/560,072 filed on Sep. 4, 2019 (now granted as U.S. Pat. No. 10,757,585 which issued on Aug. 25, 2020), which is a continuation of U.S. application Ser. No. 16/260,615 filed on Jan. 29, 2019 (now granted as U.S. Pat. No. 10,455,432 which issued on Oct. 22, 2019), which is a continuation of U.S. application Ser. No. 15/881,818 filed Jan. 29, 2018 (now granted as U.S. Pat. No. 10,231,137 which issued on Mar. 12, 2019), which is a continuation of Ser. No. 15/291,572 filed Oct. 12, 2016 (now granted as U.S. Pat. No. 9,924,378 which issued on Mar. 20, 2018), which is a continuation of U.S. application Ser. No. 15/002,609 filed Jan. 21, 2016 (now granted as U.S. Pat. No. 9,497,640 which issued on Nov. 15, 2016), which is a continuation of U.S. application Ser. No. 14/689,335 filed Apr. 17, 2015 (now granted as U.S. Pat. No. 9,277,420 which issued on Mar. 1, 2016), which is a continuation of U.S. application Ser. No. 13/832,752 filed Mar. 15, 2013 (now granted as U.S. Pat. No. 9,014,704 which issued on Apr. 21, 2015), the entire contents of which are incorporated herein by reference.

TECHNICAL FIELD

Example embodiments generally relate to wireless communications and, more particularly, relate to employing concentric cells to provide wireless communication at various altitudes.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

Conventional ground based wireless communications systems use vertical antennas to provide coverage for device connectivity. Antennas used in terrestrial systems typically provide coverage in the azimuthal, or horizontal, plane with a width of 65 to 90 degrees. The elevation, or vertical, pattern is typically more narrow in order to maximize the antenna performance in the horizontal plane, which can result in a larger coverage area, increased signal strength or clarity in the coverage area, etc. With focus on the horizontal plane, however, these existing antennas may be unable to support connectivity for aircraft traveling above an elevation of the coverage area.

BRIEF SUMMARY OF SOME EXAMPLES

The continuous advancement of wireless technologies offers new opportunities to provide wireless coverage for aircraft at varying elevations using multiple antennas installed at certain sites. A first antenna array is provided at a cell site that can include one or more antennas positioned at an angle and having a vertical beam width to provide coverage at an elevation range over a related distance. A second antenna array is also provided and positioned at a different elevation angle from the first antenna array to provide coverage for another elevation range over the related distance. In this regard, potential coverage gaps caused by the antennas of the first array near the cell site can be covered by the second antenna array. Cells formed by the transmitting first antenna array and second antenna array can be concentric over the elevation, and can achieve a cylindrical coverage area for air-to-ground (ATG) wireless communications extending to at least to a desired elevation above, and/or a radial distance around, the cell site. Moreover, one or more patch antennas can be provided to form a cell within any coverage gaps over the cell site.

In one example embodiment, a base station providing ATG wireless communication over various elevations of an ATG cell is provided. The base station includes a first antenna array comprising one or more antennas configured to form a first cell coverage area extending substantially from a horizon up to a first elevation angle away from the first antenna array to a predetermined distance from the first antenna array. The base station further includes a second antenna array configured at an uptilt elevation angle to form a second cell coverage area extending at least from the first elevation angle to a second elevation away from the second antenna array, wherein the first cell coverage area and the second cell coverage area are concentric to define the ATG cell at least to the predetermined distance and up to a predetermined elevation.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
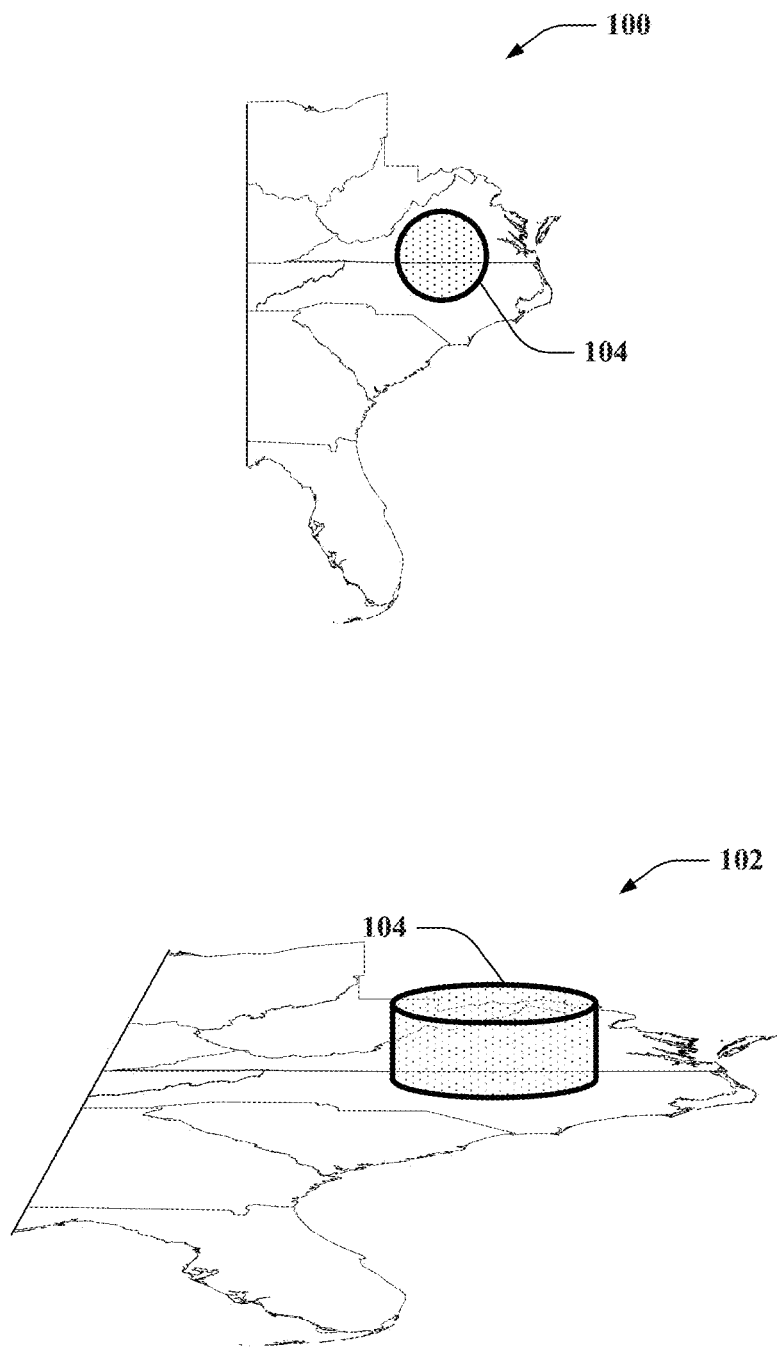
FIG. 1 illustrates a top view and horizon view of an example desired cylindrical coverage area for air-to-ground (ATG) wireless communications.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals may be used to refer to like elements throughout. Furthermore, as used herein, the term "or" is to be interpreted as a logical operator that results in true whenever one or more of its operands are true.

Some example embodiments described herein provide architectures for improved aircraft wireless communication performance. In this regard, some example embodiments may provide for base stations having antenna structures that facilitate providing wireless communication coverage in vertical and horizontal planes with sufficient elevation to communicate with aircraft at high altitudes. In this regard, while conventional cellular networks need only concern themselves with coverage provided in a two dimensional (2D) environment, an air-to-ground (ATG) network necessarily much account for a third dimension, namely altitude. Thus, to facilitate the provision of continuous 3D coverage over a desired area, example embodiments employ some structural changes to antenna structures to facilitate long reach of antennas while still achieving such reach to the operating altitudes at which aircraft operate.

In an example embodiment, multiple antennas may be positioned at varying elevation angles on a base station to provide at least a 3D coverage zone (e.g., a cylinder of coverage) within which aircraft can communicate with the base stations a varying altitudes and regardless of aircraft location with respect to the base station. In this regard, for example, a first series of directional antennas may be oriented to provide coverage of sectors to form 360 coverage around a base station between the horizon and a first elevation angle. At least one additional series of directional antennas may be placed corresponding to the antennas of the first series but angled at a higher center elevation so that the additional series of directional antennas covers an area at least between the first elevation angle and some higher elevation angle to give a long reaching coverage range at the horizon that extends to relatively high altitudes.

In a specific example, a first antenna array can be provided to facilitate wireless communications at least at a certain elevation range for a given radial distance across a horizontal plane. A second antenna array can also be provided at uptilt elevation angles to facilitate wireless communications at another elevation range above the certain elevation range. The antennas can allow for concentric overlapping cells that provide a total coverage cell throughout the corresponding elevation ranges (and corresponding altitudes) at radial distances near to and far from the base station. In addition, one or more patch antennas can be provided to facilitate wireless communications in coverage gaps over the base stations (e.g., directly above the base stations).

FIG. 1 illustrates a target area for base station coverage in air-to-ground (ATG) wireless communications. A top view 100 and a three dimensional horizon view 102 of a map of a southeastern portion of the United States are shown. In the top view 100, a base station (not shown) can provide the target area 104 by communicating over a plurality of antennas to allow for communicating signals at a radial distance from the center of target area 104 and/or at an azimuth to cover at least the circular boundaries defined by coverage area 104. It is to be appreciated that the effective base station coverage area can extend beyond the circular coverage area 104, in one example; however, the circular coverage area 104 can be a minimum coverage area for determining a location of another base station in deploying the network. Additional base stations can be deployed, though not shown for ease of explanation, to provide additional coverage across the map 100. In one example, sufficient base stations can be deployed to facilitate complete or nearly complete horizontal plane coverage for the map 100 using multiple coverage areas 104. However, other embodiments may simply cover air corridors that are commonly traveled by commercial airliners or other aircraft.

In addition, coverage area 104 can have an elevation aspect to provide a somewhat cylindrical coverage area. In this regard, aircraft flying at various altitudes can receive wireless communications from a base station providing the coverage area 104 regardless of distance to the base station. As described, the effective coverage area may not be cylindrical in shape; however, the cylindrical coverage area 104 can be a minimum coverage area that the base station can be expected to provide. Furthermore, additional base stations providing at least the cylindrical coverage areas can be positioned near coverage area 104, though not shown for ease of explanation, to provide additional coverage across the map 102.

Base station antennas may be used in a first antenna array to provide a coverage area that expands to a desired elevation (and beyond) subject to a vertical beam width projected by the antenna over a distance away from the base station. Such antennas, however, may not allow for fully covering the desired elevation near the antennas, and thus aircraft traveling at higher elevations near the base station may not be able to communicate with the base station to receive ATG wireless communications. Thus, to achieve at least the cylindrical coverage area 104, such that coverage is provided at high elevations near the base station, a second antenna array can be used to provide additional ATG wireless communication in the elevation space near the base station that lacks coverage from the base station antennas. Moreover, to the extent coverage gaps remain from the first and second antenna arrays, additional patch antennas can be employed to provide ATG wireless communication as well (e.g., directly overhead of the base station antennas). It is to be appreciated that other antennas can be used in the antenna arrays instead of conventional base station antennas, so long as ATG wireless communications are provided at a desired elevation out to a desired radial distance from the base station.

Figure 2:
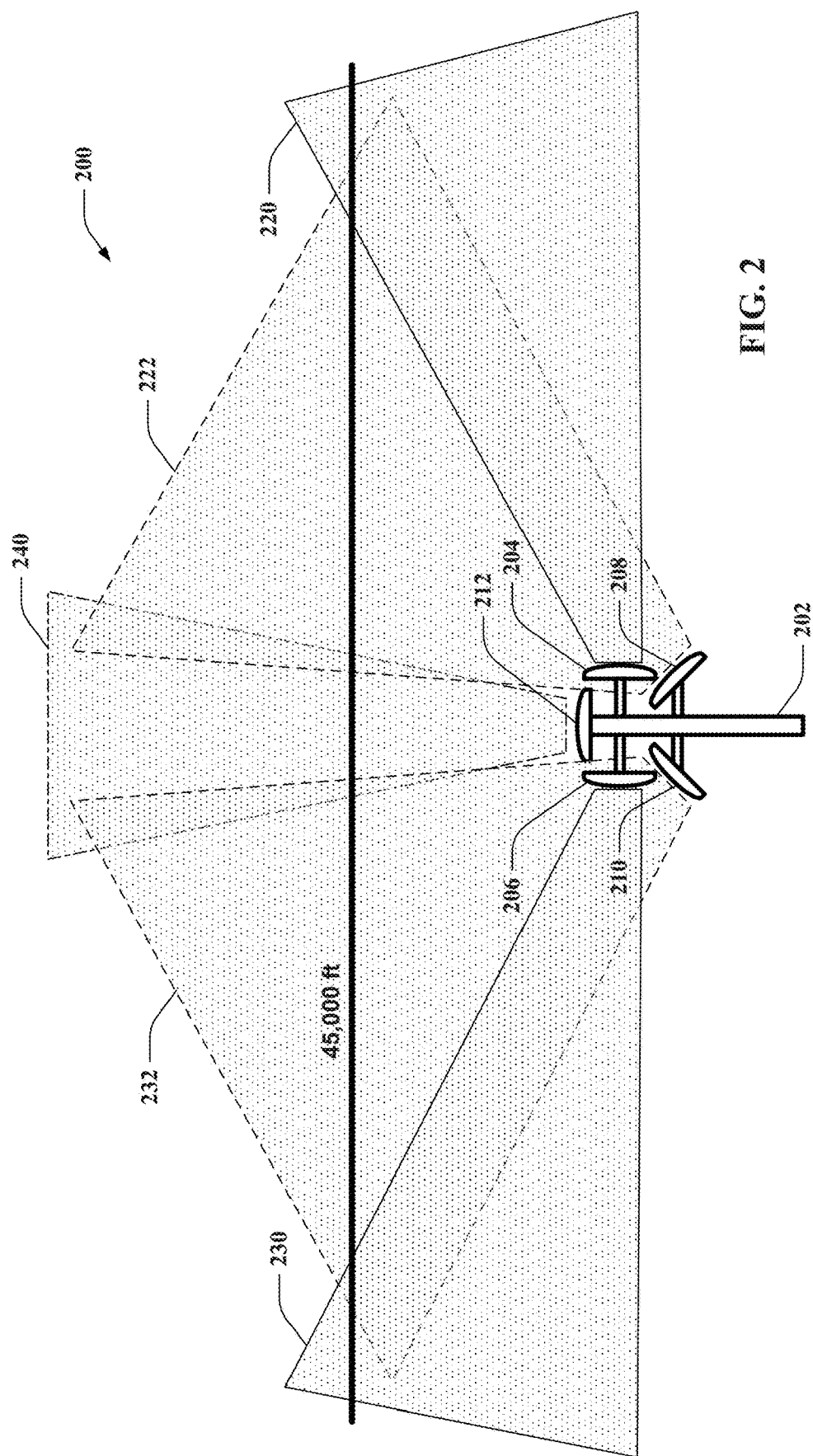
FIG. 2 illustrates an aspect of an example system with an antenna configuration that provides at least the desired cylindrical coverage area.

FIG. 2 illustrates an example system 200 that uses multiple antennas at a base station to provide at least a cylindrical coverage area. System 200 includes a base station 202 having multiple antennas 204, 206, 208, 210, and 212 to facilitate providing wireless communications to aircraft within defined coverage areas. In one example, antennas 204 and 206 can form at least a portion of a first antenna array at the base station 202. In one specific example, the antennas 204 and 206 project a vertical beam width with a degree to provide first cell coverage areas 220 and 230 extending substantially from the horizon up to a first elevation angle away from antennas 204 and 206 to a predetermined distance from the antennas 204 and 206. In one specific example, antennas 204 and 206 can have around a 5-10 degree vertical beam width to facilitate providing coverage at a 45,000 feet (ft) altitude over a certain radial distance from the base station 202. Moreover, though shown as configured substantially parallel to base station 202, it is to be appreciated that antennas 204 and 206 can have a small uptilt or downtilt elevation to optimize long-range coverage up to normal flight altitudes (e.g., 45,000 ft). Antennas 204 and 206 can provide respective coverage areas 220 and 230. In one example, antennas 204 and 206 can be, or can be similar to, conventional base station antennas except that they can provide coverage increasing in elevation as radial distance increases. For example, as depicted, the beam width of coverage areas 220 and 230 extends at the first elevation angle to eventually reach 45,000 ft and can continue achieving at least that altitude for at least a predetermined distance (e.g., 100 miles), but does not cover a predetermined altitude (e.g., 45,000 ft) immediately near the base station 202.

In this regard, a second antenna array, which includes at least antennas 208 and 210 can be provided to fill coverage gaps near the base station 202 and/or at higher altitudes nearer the base station 202. Antennas 208 and 210 are configured at an uptilt elevation angle as compared to antennas 204 and 206 in the first antenna array, as depicted, to provide a second cell coverage areas 222 and 232 extending at least from the first elevation angle of the first cell coverage areas 220 and 230 to a second elevation away from antennas 208 and 210. In this example, antennas 208 and 210 provide the respective coverage areas 222 and 232 to fill at least a portion of the coverage gaps of antennas 204 and 206 up to a target altitude (e.g., 45,000 ft) near base station 202. In any case, the first cell coverage areas 220 and 230, and the second cell coverage areas 222 and 232, are concentric and can form an ATG cell for providing ATG wireless communications over the target altitude.

In some examples, antennas 204 and 206 may be configured at an uptilt elevation angles such that their respective coverage areas 222 and 232 converge within a certain distance above base station 202 to provide coverage up to 45,000 ft directly above base station 202, though some small altitudinal distance above base station 202 may not be covered. In another example, an additional patch antenna 212 is configured perpendicularly to base station 202 to provide coverage area 240 to fill at least a portion of remaining coverage gaps between coverage areas 222 and 232, thus forming another cell coverage area 240 of the ATG cell. Thus, to the extent second antenna array antennas 208 and 210 do not sufficiently fill coverage gaps near base station 202, patch antenna 212 can further provide coverage closer still to base station 202. For example, patch antenna 212 can provide a cell coverage area concentric with the first and second cell coverage areas at a point directly above the base station 202 at the desired altitude (e.g., 45,000 ft). In this regard, antennas 204, 208, and 212 provide overlapping concentric cells to result in continuous vertical coverage over an azimuth defined by the antennas to form the ATG cell. Antennas 206, 210, and 212 similarly provide concentric cells to form the ATG cell.

Though two antenna arrays (e.g., the first array with antennas 204 and 206, and the second array with antennas 208 and 210), are shown providing coverage at opposite directions (e.g., at a 180 degree difference) in this two dimensional view of the base station 202, it is to be appreciated that additional antenna arrays can be configured around base station 202 in the respective antenna arrays to provide similar altitudinal coverage in additional directions (e.g., at 60 degree, 90 degree, etc. intervals) depending on the coverage azimuth of a given antenna. In this regard, each antenna array can provide a sector of coverage in a multi-sector configuration. Furthermore, in an example, base station 202 can instead include a single antenna array with omnidirectional antennas each configured to provide substantially circular coverage at a respective elevation angle in a single sector configuration. In other words, for example, concentric cell coverage areas may be defined such that substantially donut shaped radiation patterns are radiated from an antenna array with at least one such pattern covering lower elevations and another pattern covering a concentrically located area at higher elevations. With the use of a patch antenna to cover directly above the array, a continuous cylinder of coverage may be defined out to a predetermined range and up to a predetermined altitude using concentric cell coverage areas.

In addition, rather than employing multiple antennas in an antenna array at a given base station, in an example, antennas of neighboring base stations can be configured to provide a given elevation range of coverage. For example, a first base station can have one or more antennas configured to provide coverage from the horizon up to a first elevation angle (e.g., similarly to antennas 204 and 206). A second base station located beyond the coverage range of the first base station can provide one or more antennas configured at an uptilt angle to provide coverage from the first elevation angle to a second elevation (e.g., similarly to antennas 208 and 210), and so on. The resulting coverage pattern effectively overlaps lower altitude cylinders of cell coverage with higher altitude cylinders of coverage, and can thus achieve full coverage up to the predetermined altitude over a deployment area.

Moreover, though the first antenna array and second antenna array can include multiple antennas installed at the specific locations on base station 202, in one example only one perpendicular patch antenna 212 may be needed to cover an area centered above base station 202. In any case, at least the cylindrical coverage area 104, depicted previously, can be achieved up to 45,000 ft (or other altitudes) by the multiple antennas 204, 206, 208, 210, 212, and/or other antennas of base station 202. In this example, antennas at varying uptilt (or downtilt) angles achieve the needed elevation near the base station to provide coverage in high altitudes around the base station 202, and antennas at various circumferential positions around the base station provide the needed azimuth to provide coverage over a radial distance.

It is to be appreciated, for example, that antennas 204 and 206 can provide coverage at further distances on the horizontal plane due to a more concentrated signal, and thus effective coverage of coverage areas 220 and 230 can continue for distances beyond those for coverage areas 222 and 232. Accordingly, base stations, such as base station 202 can be deployed based on the radial distance of coverage provided by respective antennas 204 and 206 of the first antenna array to provide adjacent or overlapping cylindrical coverage areas at the desired altitude, and respective second antenna array antennas 208 and 210, or patch antenna 212, at each of the base stations can provide needed coverage near the base stations to achieve the desired altitude. Moreover, in one example, base station 202 can employ a radio switch to alternate between using antennas on the first antenna array, such as antennas 204 and 206, antennas of the second antenna array, such as antennas 208 and 210, and/or patch antennas, such as antenna 212, to conserve radio resources, mitigate potential interference between the concentric cells, etc.

Figure 3:
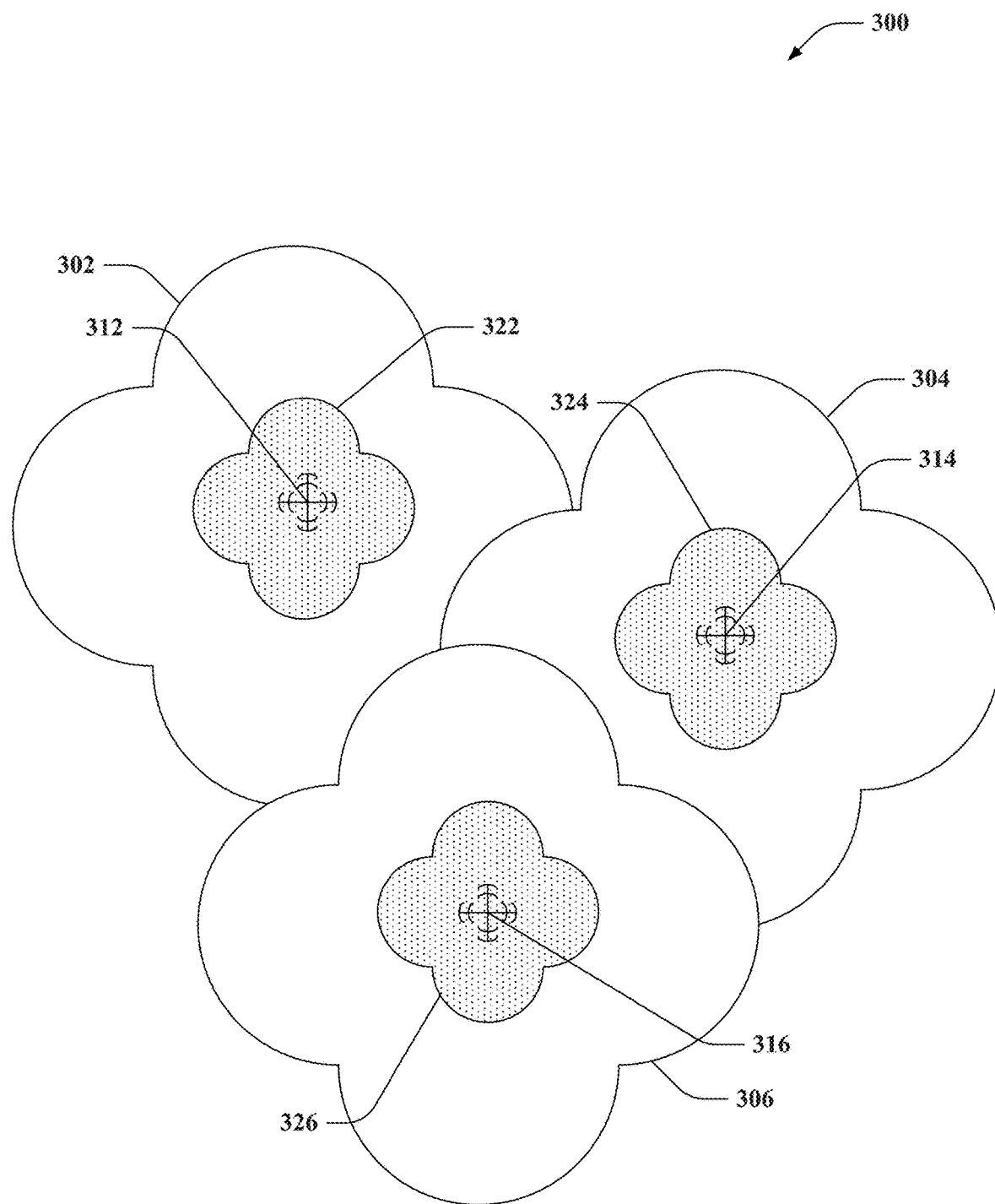
FIG. 3 illustrates a top view of an example coverage area provided by the antenna configuration of FIG. 2.

FIG. 3 illustrates a top view of example base station deployments 300 for providing concentric cells to facilitate continuous ATG wireless coverage at high altitudes for at least a predetermined distance from the base stations. For example, cell coverage areas 302, 304, and 306 are respectively provided by base stations 312, 314, and 316. The cell coverage areas 302, 304, and 306 are clover shaped based on the azimuth and position of the antennas on base stations 312, 314, and 316, which are shown at 90 degree intervals around the base stations 312, 314, and 316, in this example, and provide at least a 90 degree azimuth, in the depicted example. As described, the cell coverage areas 302, 304, and 306 can have a vertical beam width that allows the cell coverage areas to achieve an elevation as projected from the antennas of base stations 312, 314, and 316.

This configuration, however, can provide coverage gaps at certain altitudes for a radial distance from the base station to the point where the cell coverage areas reach the desired altitude. In this regard, as described, additional antennas are configured at base stations 312, 314, and 316 to deploy concentric cell coverage areas 322, 324, and 326 that provide coverage in the altitudinal coverage gaps of cell coverage areas 302, 304, and 306, respectively, to define an ATG cell. As described, the additional antennas are configured at higher uptilt elevation angles than those providing cell coverage areas 304, 304, and 306 such that cell coverage areas 322, 324, and 326 cover higher altitudes near base stations 302, 304, and 306, but not necessarily at the radial distance of cell coverage areas 302, 304, and 306. Additional antennas can be provided where further gaps exist (e.g., an antenna perpendicular to the given base station 312, 314, or 316, that provides coverage directly above the base station as well). Moreover, multiple additional ATG cells can be similarly configured to provide continuous coverage over a target area at least at the desired altitude.

Moreover, in an example, the antennas providing cell coverage areas 322, 324, and 326 can be rotated at a rotational offset from the antennas providing cell coverage areas 302, 304, and 306 (e.g., by 45 degrees where antennas are positioned at 90 degrees) to mitigate the clover shaped coverage pattern. Coverage areas 322, 324, and 326 are depicted as covering a significantly smaller distance than coverage areas 302, 304, and 306; it is to be appreciated that this is shown to indicate the altitudinal coverage deficiency of cell coverage areas 302, 304, and 306 that is filled by coverage areas 322, 324, and 326. Indeed, cell coverage areas 322, 324, and 326 can have a coverage area distance similar to cell coverage areas 302, 304, and 306 or at least greater than that depicted in FIG. 3. In this regard, rotating the antennas providing cell coverage areas 322, 324, and 326 (e.g., antennas 208 and 210 in FIG. 2) to offset from antennas providing cell coverage areas 302, 304, and 306 (e.g., antennas 204 and 206 in FIG. 2) by around 45 degrees (or at least at a number of degrees substantially half of the number of degrees separating the antennas around the base station) allows the antennas providing coverage areas 322, 324, and 326 to be directed between the antennas providing coverage areas 302, 304, and 306 such to fill coverage gaps between the antennas.

Figure 4:
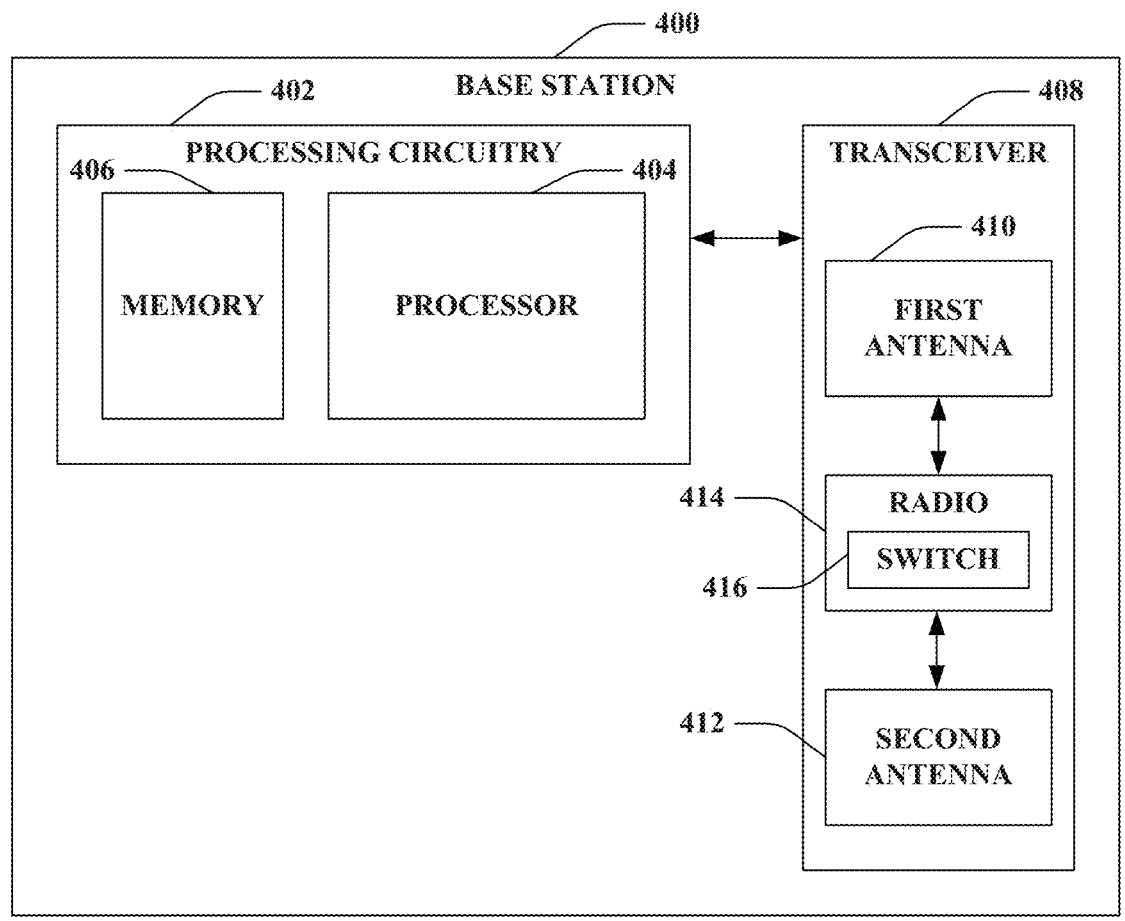
FIG. 4 illustrates a functional block diagram of a base station of an example embodiment.

FIG. 4 illustrates a functional block diagram of a base station 400 in an example embodiment. In this regard, for example, the base station 400 may include processing circuitry 402 that may be configurable to perform control functions in accordance with example embodiments. The processing circuitry 402 may provide electronic control inputs to one or more functional units of an aircraft for providing ATG wireless communications thereto. The processing circuitry 402 may be configured to perform data processing, control function execution and/or other processing and management services according to an example embodiment.

In some examples, the processing circuitry 402 may be embodied as a chip or chip set. In other words, the processing circuitry 402 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 402 may therefore, in some cases, be configured to implement an embodiment of the disclosed subject matter on a single chip or as a single "system on a chip." As such, in some cases, a chip or chipset may constitute means for performing one or more operations for providing the functionalities described herein.

In an example embodiment, the processing circuitry 402 may include one or more instances of a processor 404 and memory 406 that may be in communication with or otherwise control a transceiver 408. The processing circuitry 402 may be embodied as a circuit chip (e.g., an integrated circuit chip) configured (e.g., with hardware, software or a combination of hardware and software) to perform operations described herein. However, in some embodiments, the processing circuitry 402 may be embodied as a portion of an on-board computer. The transceiver 408 may include one or more mechanisms for enabling communication with various devices. In some cases, the transceiver 408 can include device or circuitry embodied in either hardware, or a combination of hardware and software that is configured to receive and/or transmit data from/to aircraft or other devices in communication with the processing circuitry 402. Thus, for example, the transceiver 408 may allow for communication via different antennas, such as a first antenna 410 and a second antenna 412.

In an example embodiment, the processing circuitry 402 may be configured to control configuration or operation of one or more instances of the transceiver 408 to facilitate operation of the first antenna 410 and second antenna 412 via one or more radios 414. In one example, radio 414 includes a switch 416 to switch between activating first antenna 410 and second antenna 412. In another example, though not depicted, the antennas 410 and 412 can use independent radios, and/or can transmit signals concurrently. In any case, processing circuitry 402 can use transceiver 408 to provide cell coverage via communications using first antenna 410 and/or second antenna 412 to provide concentric cell coverage areas, as described. Transceiver 408 can employ additional antennas (not shown) to provide additional concentric cells to achieve a cylindrical coverage area. In this regard, the first antenna 410 can be part of a first antenna array, and the second antenna 412 can be part of a second antenna array. One or more patch antennas can be controlled by transceiver 408 as well (and/or can be switched using radio 414), though not shown.

The processor 404 may be embodied in a number of different ways. For example, the processor 404 may be embodied as various processors, such as one or more of a microprocessor or other processing element, a coprocessor, a controller or various other computing or processing devices including integrated circuits such as, for example, an application specific integrated circuit (ASIC), a field programmable gate array (FPGA), or the like. In an example embodiment, the processor 402 may be configured to execute instructions stored in the memory 406 or otherwise accessible to the processor 404. As such, whether configured by hardware or by a combination of hardware and software, the processor 404 may represent an entity (e.g., physically embodied in circuitry—in the form of processing circuitry 402) capable of performing operations according to embodiments of the present invention while configured accordingly. Thus, for example, when the processor 404 is embodied as an ASIC, FPGA or the like, the processor 404 may be specifically configured hardware for conducting the operations described herein. Alternatively, as another example, when the processor 404 is embodied as an executor of software instructions, the instructions may specifically configure the processor 404 to perform the operations described herein.

In an example embodiment, the processor 404 (or the processing circuitry 402) may be embodied as, include or otherwise control the operation of the base station 400, as described herein. As such, in some embodiments, the processor 404 (or the processing circuitry 402) may be said to cause each of the operations described in connection with the base station 400 in relation to operation of the base station 400 by directing components of the transceiver 408 to undertake the corresponding functionalities responsive to execution of instructions or algorithms configuring the processor 404 (or processing circuitry 402) accordingly.

In an exemplary embodiment, the memory 406 may include one or more non-transitory memory devices such as, for example, volatile and/or non-volatile memory that may be either fixed or removable. The memory 406 may be configured to store information, data, applications, instructions or the like for enabling the processing circuitry 402 to carry out various functions in accordance with exemplary embodiments described herein. For example, the memory 406 could be configured to buffer input data for processing by the processor 404. Additionally or alternatively, the memory 406 could be configured to store instructions for execution by the processor 404. As yet another alternative, the memory 406 may include one or more databases that may store a variety of data sets related to functions described herein. Among the contents of the memory 406, applications may be stored for execution by the processor 404 in order to carry out the functionality associated with each respective application. In some cases, the applications may include instructions for recognition of various input signals related to component status or operational parameters and, if necessary, applying timing control, encryption, channel control and/or the like associated with handling the reception of such signals. The applications may further include instructions for operational control of the base station 400, as described above.

Figure 5:
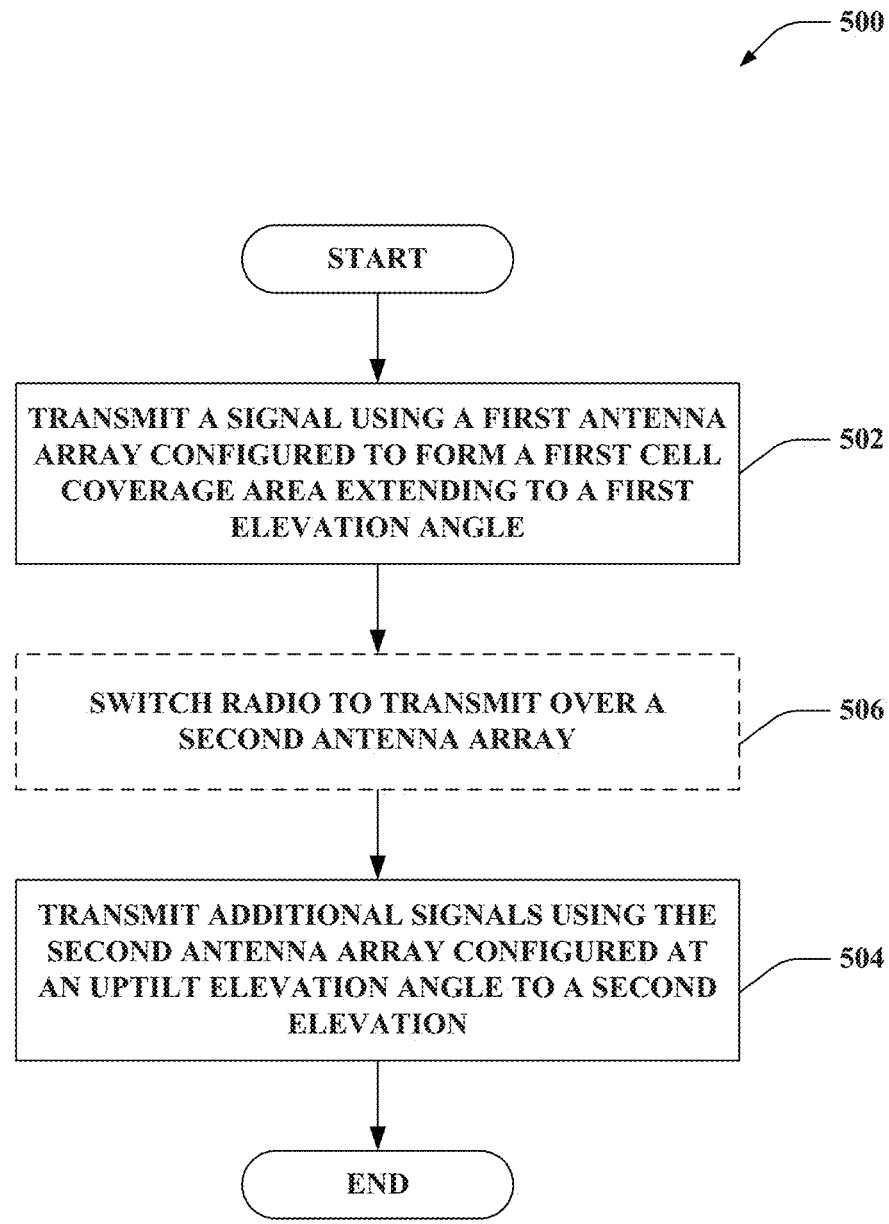
FIG. 5 illustrates an example methodology for providing concentric cells to facilitate ATG wireless communications at desired elevations.

Referring to FIG. 5, a methodology that can be utilized in accordance with various aspects described herein is illustrated. While, for purposes of simplicity of explanation, the methodology is shown and described as a series of acts, it is to be understood and appreciated that the methodology is not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

FIG. 5 illustrates an example methodology 500 for providing cell coverage areas to facilitate ATG wireless communications at desired elevations over a radial distance. At 502, a signal can be transmitted using a first antenna array configured to form a first cell coverage area extending to a first elevation angle. For example, the first antenna can be installed substantially parallel to the base station (or at a small uptilt or downtilt angle) for projecting signals across a radial distance from the base station in a horizontal plane. The first antenna array can be configured to transmit the signals to have an increasing vertical beam width, which can extend from the horizon at the first elevation angle and reach a desired elevation at a given distance. This may, however, result in a coverage gap up to the desired elevation for a radial distance from the base station to the point where the first antenna array signals reach the desired elevation.

Thus, at 504, additional signals can be transmitted using a second antenna array configured at an uptilt elevation angle to a second elevation. For example, the second antenna array can be configured at the location of antennas in the first antenna array, but can be angled upward by a certain tilt to fill the coverage gap at the desired elevation between the base station and the point where the first antenna array signals reach the desired elevation. The second antenna array can be configured to transmit at another vertical beam width from at least the first elevation angle towards a second elevation angle. It is to be appreciated that additional patch antennas can be provided as well (e.g., one substantially perpendicularly to the base station to fill any remaining coverage gap centered above the base station).

Optionally, at 506, a radio can be switched to transmit over the second antenna array. Switching between antennas using a single radio can conserve radio resources, mitigate interference between the various coverage cell signals, and/or the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An air-to-ground (ATG) wireless communication network comprising:
    a plurality of base stations deployed to define three dimensional coverage up to a predetermined altitude, wherein the base stations comprise:
    a first antenna array comprising a first set of antennas installed at respective different sectors to define a first area of coverage around the base station between the horizon and a first elevation angle, the first antenna array forming a first cell coverage area; and a second antenna array configured at an uptilt elevation angle, the second antenna array comprising a second set of antennas installed at respective sectors to define a second area of coverage to form a second cell coverage area.

2. The network of claim 1, wherein the second cell coverage area extends above the first elevation angle and originates from a same point as the first cell coverage area.

3. The network of claim 2, wherein the first cell coverage area and the second cell coverage area each extend away from the base stations substantially a same radial distance.

4. The network of claim 3, wherein the radial distance is at least 100 miles.

5. The network of claim 1, wherein the first antenna array and the second antenna array each employ different respective radios to enable the first and second antenna arrays to transmit signals concurrently.

6. The network of claim 1, wherein the first and second cell coverage areas overlap each other at an overlap region that extends radially away from the base stations and that extends in elevation as radial distance from the base stations increases.

7. The network of claim 1, wherein the second antenna array is configured to transmit signals at a higher elevation and vertical beam width than the first set of four antennas of the first antenna array at a given radial distance from the base stations.

8. The network of claim 1, wherein the base stations are geographically separated to overlap each other to provide complete horizontal plane coverage of a geographic area.

9. The network of claim 1, wherein each of the base stations of the network includes a corresponding instance of the first antenna array and the second antenna array and a sky cell providing coverage directly above the each of the base stations.

10. The network of claim 1, wherein the second cell coverage area extends from the first elevation angle to a second elevation angle.

11. The network of claim 10, wherein the at least one of the base stations further comprises a patch antenna providing coverage from the second elevation angle to a zenith directly above the at least one of the base stations.

12. The network of claim 1, wherein the predetermined altitude is about 45,000 ft.

13. The network of claim 1, wherein the first and second cell coverage areas each cover a range of altitudes that increase as radial distance from the base stations increases.

14. The network of claim 13, wherein the second cell coverage area extends over a first range of altitudes that is overlaid above a second range of altitudes associated with the first cell coverage area.

15. The network of claim 1, wherein the first antenna array and the second antenna array are configured such that the first cell coverage area and the second cell coverage area are concentric over a similar azimuth and combine to provide full coverage up to the predetermined altitude out to a radial distance defined from the at least one of the base stations.

16. The network of claim 1, wherein each of the first and second coverage areas has a clover shape.

17. The network of claim 1, wherein each of the first and second coverage areas has a cylindrical shape.

18. The network of claim 1, wherein each of the first and second coverage areas has a same shape.

\* \* \* \* \*